United States Patent [19]

Armiroli et al.

[11] Patent Number: 5,092,696

[45] Date of Patent: Mar. 3, 1992

[54] GRAPHICS PRINTER INCLUDING PRINT MEDIUM GUIDANCE SYSTEM

[75] Inventors: Jean Armiroli, Villejuif; Jean-Pierre Cointre, Le Plessis Trevise, both of France

[73] Assignee: Oce Graphics France S.A., Creteil, France

[21] Appl. No.: 631,414

[22] Filed: Dec. 21, 1990

[30] Foreign Application Priority Data

Dec. 29, 1989 [FR] France .................. 89 17469

[51] Int. Cl.⁵ .................................. B41J 11/26
[52] U.S. Cl. .................................. 400/611; 226/91; 271/211; 101/417; 198/493; 118/62; 162/365
[58] Field of Search ............ 400/611, 619, 627, 608.3; 101/416.1, 417, 419, 420, 424.1, 488; 226/7, 95, 97, 91; 271/283, 211, 284, 309, 195, 225, 902; 198/380, 493, 955; 493/450, 418; 118/24, 62; 162/134, 306, 365, 363, 364

[56] References Cited

U.S. PATENT DOCUMENTS

| | | | |
|---|---|---|---|
| 2,138,178 | 11/1938 | Lang | 271/195 |
| 2,144,919 | 1/1939 | Gautreau | 101/417 |
| 2,736,106 | 2/1956 | Offen | 101/420 |
| 2,790,638 | 4/1957 | Wockenfuss | 400/611 |
| 2,811,920 | 11/1957 | Richardson | 101/416.1 |
| 3,448,907 | 6/1969 | Otepka et al. | 226/97 |
| 3,464,610 | 9/1969 | Koning | 226/97 |
| 3,502,407 | 3/1970 | Grawzow et al. | 271/211 |
| 3,622,058 | 11/1971 | Vits | 101/424.1 |
| 3,741,453 | 6/1973 | Pierce et al. | 226/97 |
| 3,931,920 | 1/1976 | Hellinger | 226/91 |
| 3,941,290 | 3/1976 | Bunning | 226/91 |
| 3,999,696 | 12/1976 | Reba et al. | 226/91 |
| 4,014,487 | 3/1977 | Reba et al. | 226/91 |
| 4,022,366 | 5/1977 | Rooney | 162/363 |
| 4,162,067 | 7/1979 | Horak et al. | 271/211 |
| 4,186,860 | 2/1980 | Reba | 226/91 |
| 4,405,125 | 9/1983 | Kulpa et al. | 271/211 |
| 4,466,605 | 8/1984 | Leuthold et al. | 271/195 |
| 4,561,645 | 12/1985 | Pollich | 271/211 |
| 4,722,276 | 2/1988 | Tyler | 101/419 |
| 4,763,822 | 8/1988 | Mohrsen | 226/91 |

FOREIGN PATENT DOCUMENTS 0043005 6/1982 European Pat. Off.

OTHER PUBLICATIONS

"Paper Detack Device", IBM Tech. Discl. Bulletin, vol. 23, No. 1, 6/80, pp. 88-90.

IBM Technical Disclosure Bulletin 7 (4) (1964) 322-323.

*Primary Examiner*—Eugene H. Eickholt
*Attorney, Agent, or Firm*—Birch, Stewart, Kolasch & Birch

[57] ABSTRACT

A graphics printer including a secondary guiding system comprising a fan arrangement for generating an air flux and directing the flux to a part of a print medium that hangs freely from the graphics printer, so as to maintain the hanging part away from the graphics printer or any object supported by it, preferably, in the case of a pen plotter equipped with devices for creating a partial vacuum beneath the print medium in an active zone of the writing instrument, the air flux being at least partially produced by suction devices.

23 Claims, 5 Drawing Sheets

GRAPHICS PRINTER INCLUDING PRINT MEDIUM GUIDANCE SYSTEM

BACKGROUND OF THE INVENTION

1. Field of the Invention

The present invention relates to a secondary guidance system for a print medium on a graphics printer in which a part of the print medium hangs loosely from the printer during printing. More specifically, the present invention relates to a vector mode graphics printer (pen plotter) in which a drawing is obtained by relative movement along two orthogonal directions between a print medium, such as a sheet of paper, and a writing head. The present invention is also applicable to graphics printers operating in a scanning mode (raster printer) in which the drawing is composed of points obtained by a line-by-line scanning while the print medium is driven past one or a plurality of writing heads.

2. Description of Related Technology

In the case of a pen plotter, for example, a drawing is generally produced by a to-and-fro movement of the print medium along a first direction (X), and a to-and-fro movement of the writing head along a second direction (Y), perpendicular to the X direction. The plotter can be adapted to use either a pre-cut sheet or a continuous roll. In the former case, the print plotter is supplied with pre-cut sheets of the desired formats. In the latter case, the print medium is drawn from a supply reel to obtain a length corresponding to the format of the drawing to be made, and the drawing is then reproduced by appropriately controlling the displacements of the print medium and the writing head.

During printing, the print medium is mainly guided by drive means acting along the X direction, e.g., a drum against which the print medium is applied by means of pressure rollers. In the vicinity of the writing zone the print medium passes over a platform that may be extended towards the front and/or the rear by a skirting. The platform may be provided with openings that communicate with a suction means in order to create a partial vacuum beneath the print medium in the zone where the printing instrument is active. These guide means ensure that the print medium is properly supported at the level of the writing zone, in order to prevent it from lifting from the platform or to start vibrating as a result of the movements imparted to it. However, once the print medium is no longer in contact with these guiding means, it hangs freely from the graphics printer.

In the case of a continuous print medium drawn from a supply reel, the remanence of the rolled state produces a tendency for the free end of the medium, hanging at the front of the graphics printer, to roll up on itself, thereby forming a loop. Accordingly, as the printed face of the print medium curls towards the rear, it can come into contact with a part of the printer or any object supported by the printer, causing the drawing to be smeared.

This risk of smearing is particularly high if the printer is equipped with an automatic storage device for the drawings. Such a device generally comprises a horizontal bar (which can be part of the printer stand) located at a lower level and slightly recessed with respect to the print medium outlet, which is at the front of the printer. The rubbing action between the loop formed at the end of the print medium on which a drawing is being made and a stored sheet on which a drawing has already been made can cause smearing of both drawings. This is all the more likely to occur if the print medium is made of a non-absorbing material, such as a sheet of polymer, on which the ink will take a long time to dry.

The contact between the loose end of the print medium and a part of the printer or an object supported by the printer can create a non-negligible sound disturbance in the immediate environment of the printer, since the medium is generally displaced by rapid to-and-fro movements with very high accelerations (up to 6 g in ultra-high-speed machines). These movements are transmitted to the hanging portion of the medium and tend to cause that portion to oscillate, thereby generating noise on contact. This is all the more of a nuisance if it is the free edge of the medium that establishes the contact.

The prior art approaches to solving this problem rely solely on a mechanical secondary guiding means to steer the hanging portion of the print medium away from the printer. These means are, e.g. bars, rollers or other guides arranged in various ways to maintain the sheet in a non-contacting position, by acting on its unprinted surface. Accordingly, all these known solutions turn out to be relatively complex from a mechanical point of view. Moreover, they add to the overall dimensions of the printer, at least in its operating configuration. Furthermore, these mechanisms prove to be noisy owing to the displacement speeds of the print medium and the snatching movements produced by the high accelerations.

SUMMARY OF THE INVENTION

Therefore, it is an object of the present invention to provide a guide system for a print medium on a graphics printer which will overcome the above noted disadvantages.

It is a further object of the present invention to provide a secondary guiding system for a graphics printer that is free of the drawbacks of the prior art.

Another object of the present invention is to provide a graphics printer including a print medium guidance system which prevents a loosely hanging part of the print medium from physically contacting any part of the printer.

Yet, another object of the present invention is to provide a guide system for a graphics printer in which a part of the print medium hangs loosely from the printer during printing.

The foregoing objects and others are accomplished in accordance with the present invention, generally speaking, by providing a system that comprises means for generating an air flux and directing the flux to a part of a print medium that hangs freely from the graphics printer, so as to maintain that part of the print medium away from the graphics printer or any object supported by it. Advantageously, when a pen plotter is equipped with a suction means intended to create a partial vacuum beneath the print medium in the active zone of the writing instrument of the graphics printer, the air flux is at least partially produced by the suction means. There can also be provided a dedicated air flux generator capable of cooperating with the suction means to provide an additive air flux effect. The dedicated generator is then activated as a function of the air flow that can be derived from the suction means, or as a function of the characteristics of the print medium material. The secondary guiding system may also include a deflector, defining generally a variable cross-section air outlet, so as to orient the air flux towards the print medium.

BRIEF DESCRIPTION OF THE DRAWINGS

The present invention shall be more clearly understood from the following description of the preferred embodiments given as a non-limiting example, with reference to the appended drawings, in which.

DETAILED DESCRIPTION OF THE INVENTION

Figure 1:
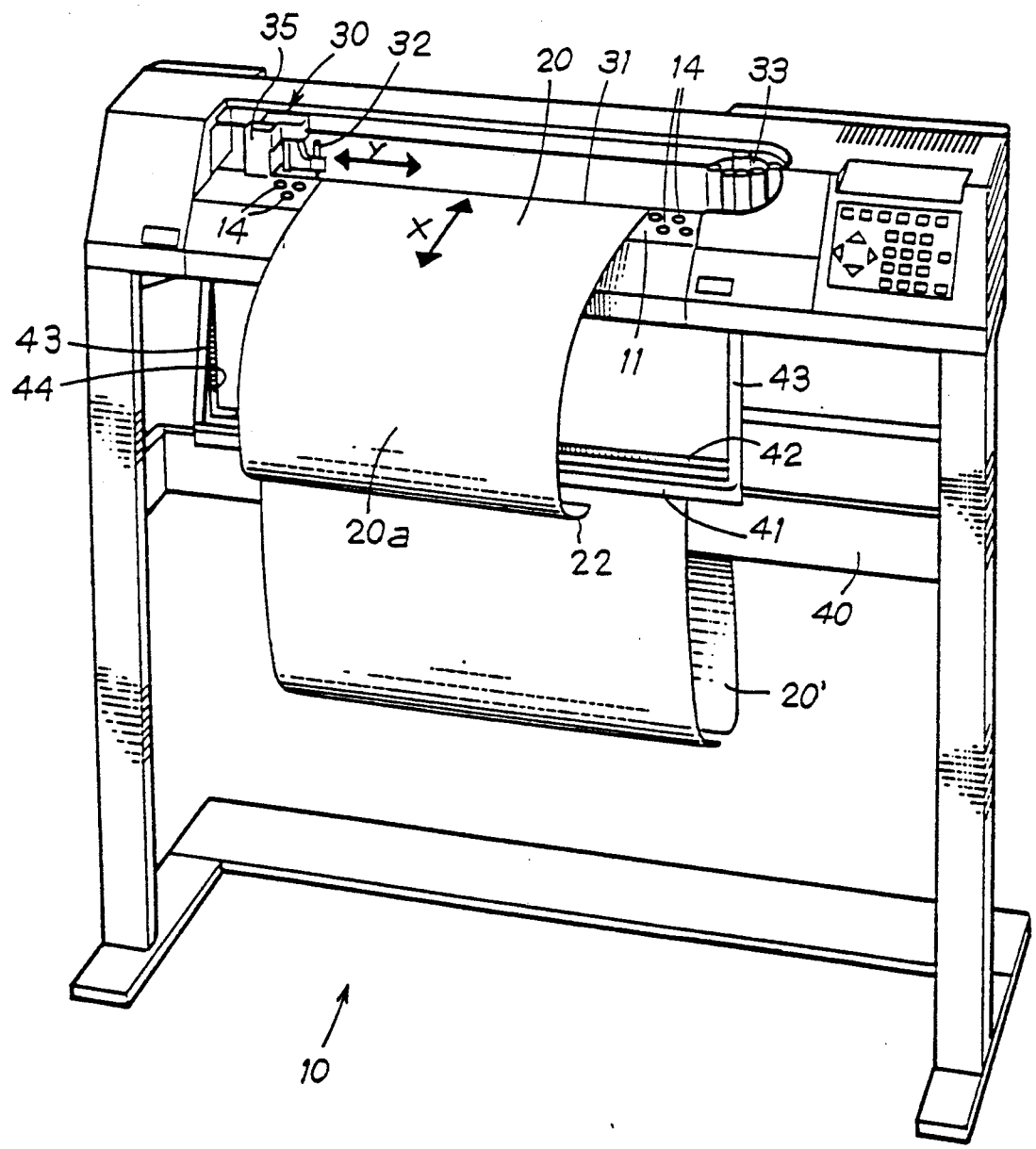
FIG. 1 is a schematic perspective view of a pen plotter to which the present invention is applicable.

A first embodiment of the print medium guiding system according to the present invention shall be described in the context of a pen plotter that uses a continuous print medium and is equipped with an automatic storage device for drawings. As can be seen from FIGS. 1 and 2, such a plotter 10 comprises a platform 11 over which is guided a print medium 20 drawn from a supply reel 21. The print medium 20 is displaced along an X direction (longitudinal direction of the print medium) by means of a drum 12 having a horizontal axis perpendicular to the X direction. The print medium 20 is pressed against the drum 12 at its edge portions by means of pressure roller 13, via a longitudinal groove formed in the platform 11.

A write head 30 is movable in a Y direction, perpendicular to the X direction, along a writing zone 31 located at the surface of the platform 11. The write head 30 carries a writing instrument 32. Several different writing instruments can be stored in a turret 33 at the terminal point of the travel of the write head 30 to allow an automatic change-over of the writing instrument carried by the latter. A drawing is produced on the print medium 20 by a combination of a to-and-fro movement thereof in the X direction, and a to-and-fro movement of the write head 30 in the Y direction.

Before starting a drawing, a length of the print medium 20 corresponding to the format of the drawing is drawn from the supply reel 21 so as to define a loop 20b, thus limiting the inertia of the print medium during its displacement in the execution of the drawing. During execution of a drawing, the print medium 20 is held in contact with the platform 11 by means of a partial vacuum created beneath the print medium. To this end, the platform 11 comprises openings 14, at least in the active zone of the write head 30, which communicate with a suction chamber 15 containing the drum 12. A partial vacuum is created in the chamber 15 by means of a fan 16.

When the drawing is finished, the drawn format is separated from the rest of the print medium by a cutting action produced by a cutting device 35 fixed to the write head 30. The finished drawings 20' can be automatically stored by being suspended over a horizontal bar 40. This bar can form a part of the printer stand that serves to maintain the platform 11 raised from the floor. The drawings are transferred to the storage bar 40 e.g. by means of mobile horizontal bars 41,42 supported at their ends by arms 43, 44 that are articulated on the printer around a horizontal axis. The operation of the storage device shall be described in more detail below.

Figure 2:
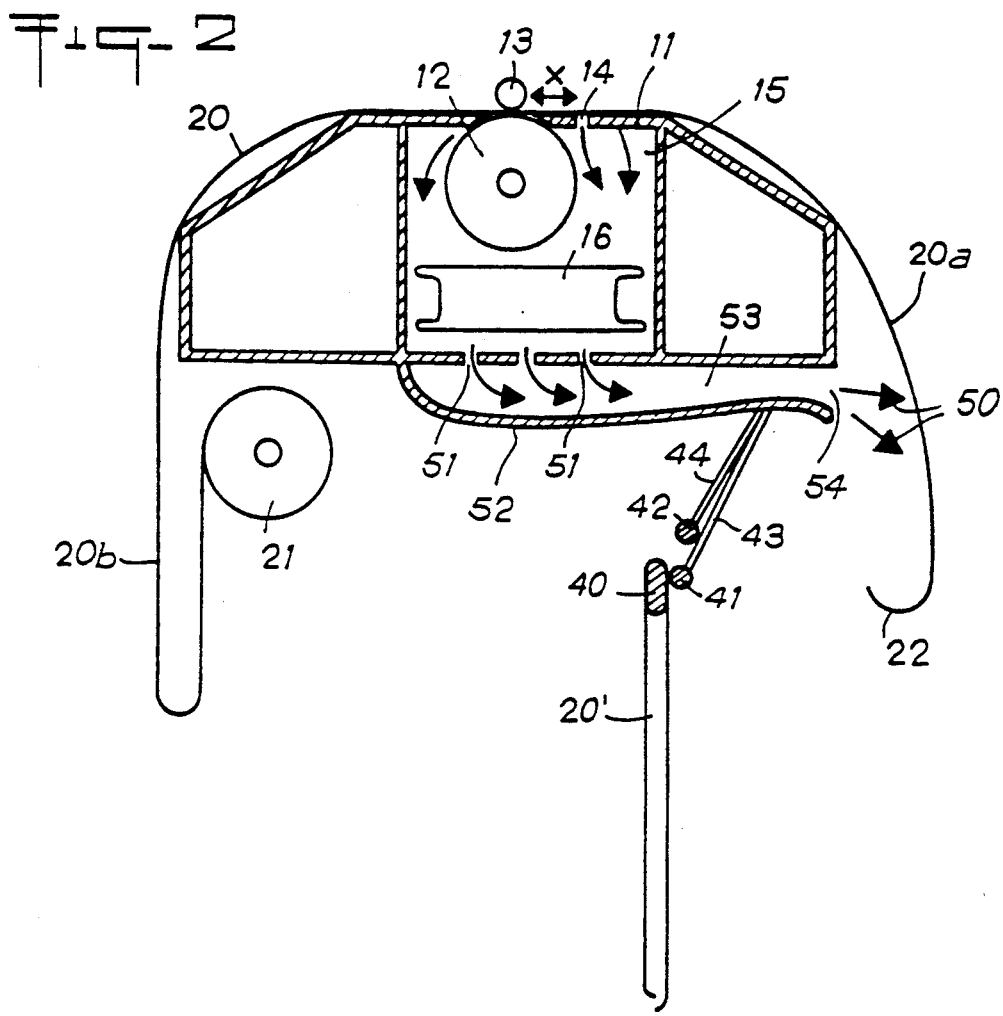
FIG. 2 is a highly schematic cross-sectional view partially showing the upper part of a pen plotter equipped with a secondary guiding system according to the present invention.

As is shown more clearly in FIG. 2, the free edge of the print medium 20 has a tendency to curl around itself to form a loop 22, owing to the remanence of its rolled state from the supply reel 21. Accordingly, the print medium 20 exposes a part of its printed face towards the storage bar 40, which is located beneath and at a retracted position from the print medium outlet, at the front of the graphics printer. It is thus necessary to maintain the part 20a of the print medium 20 which hangs beyond the printer away from the storage bar 40 (or from any other part of the printer) in order to prevent smearing of the drawing formed on the print medium, and possibly smearing of the drawing already stored on the bar 40. Indeed, the movements imparted to the print medium during execution of a drawing, combined with the aerodynamic loads at the end 22, induce displacements of the end 22, which could cause it to contact and rub violently with the bar 40 or the drawings stored thereon.

According to the present invention, there is provided a secondary guiding of a print medium by means of an air flux 50 which is generated and directed so as to maintain the part 20a of the print medium 20, hanging from the printer, away from contact with any parts of the printer or from any object supported by it, during execution of the drawing. Advantageously, the air flux 50 is at least partially produced by the fan 16 used for generating a partial vacuum beneath the print medium 20 at the level of the platform 11 in cooperation with the openings or apertures in the platform. As shown in FIG. 2, the air is driven out of the suction chamber 15 via openings 51 formed in the lower wall of the chamber, and is directed by means of a deflector 52 along a substantially horizontal direction, towards the front of the printer, immediately beneath the outlet for the print medium 20 at the front of the printer. In the illustrated embodiments, the deflector 52 forms, with the lower wall of the chamber 15, a duct 53 that defines a chamber opening at the front of the printer. The outlet 54 of the duct 53 is substantially rectangular and its width is, for example, equal to the maximum width of the print medium usable with the printer. As shown in FIG. 2, the cross-section of the duct 53 can be variable, e.g. by narrowing the duct towards the outlet 54.

Figure 3:
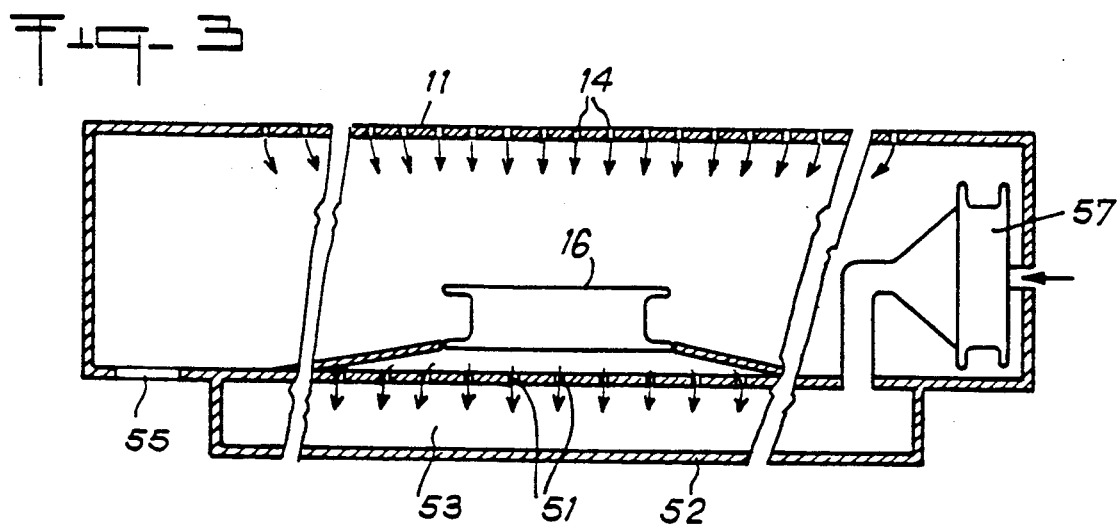
FIG. 3 is a highly schematic longitudinal cross-sectional view partially showing the upper part of a pen plotter equipped with a secondary guiding system according to a second embodiment of the present invention.

Air is admitted into the chamber 15 by means of openings 14 that are not covered by the print medium. The openings 14 are normally provided over a distance along the Y direction corresponding to the maximum width of the print medium 20 usable with the printer. Thus, to ensure that there is a minimum of air flux 50, in the case where the openings 14 are all, or practically all, covered by the print medium, there is provided at least one additional air inlet 55 in the chamber 15. This air inlet 55 is formed, for example, in an end wall of the chamber 15 or in the lower wall of the latter, outside the duct 53 (FIG. 3).

This solution may prove to be inadequate in some cases. Thus, according to a variation of the embodiment according to the present invention, there is provided a dedicated means for complementing the air flux produced by the fan 16. This dedicated means consists of at least one additional fan 57 (FIG. 3). The latter is, for example, lodged laterally in the chamber 15 and has an outlet leading to the duct 53. The fan 57 can be switched on controllably as a function of the width of the print medium used, in other words as a function of the air flow that can be supplied by the fan 16, and/or as a function of the nature of the medium material. Indeed, in the case of a material having a large surface density or rigidity, a relatively strong air flux will be necessary to effectively ensure the required secondary guiding. The fan 57 may be controlled manually or automatically. In the latter case, the fan can be controlled by a microprocessor receiving data identifying the format and the characteristics of the print medium.

According to another embodiment, there may be provided an additional deflector, parallel to deflector 52, to direct the air flux produced by the additional fan 57.

In still another variation, the additional fan can be used as a complement to the fan 16 and may serve not only for the production of the air flux 50 but also for supplementing the suction produced through the openings 14. Of course, the required number of fans working in parallel in the chamber 15 is not necessarily limited to two.

The foregoing examples concern a plotter using means to maintain the print medium adhered to the platform 11 in the vicinity of the active zone of the write head. The present invention, of course, may also be applied to plotters that do not use such a suction means. The air flux necessary for the secondary guiding is then produced by at least one dedicated fan, such as the fan 57 of FIG. 3.

Figure 4A:
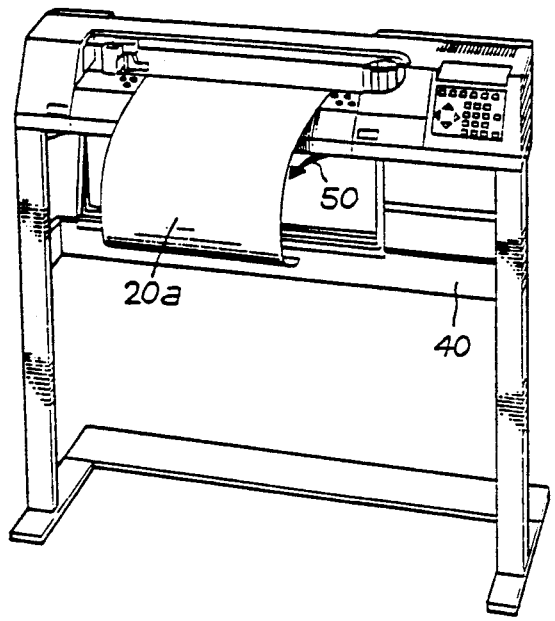
FIGS. 4A to 4E are schematic views showing the operation of a pen plotter equipped with a secondary guiding system according to the present invention and an automatic storage device for drawings.
Figure 4B:
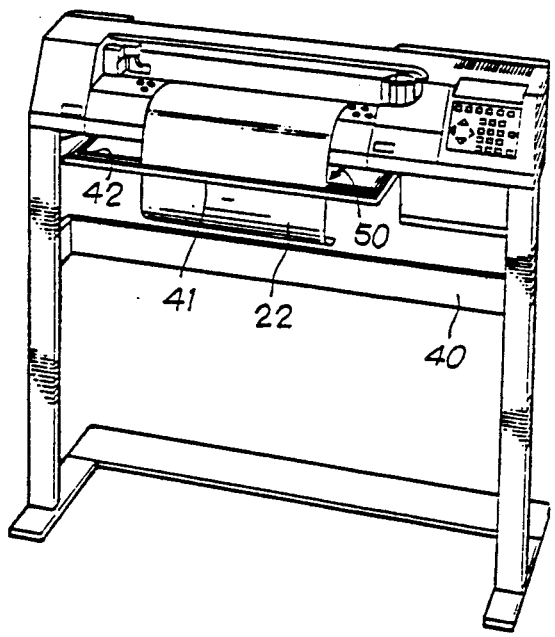
Figure 4C:
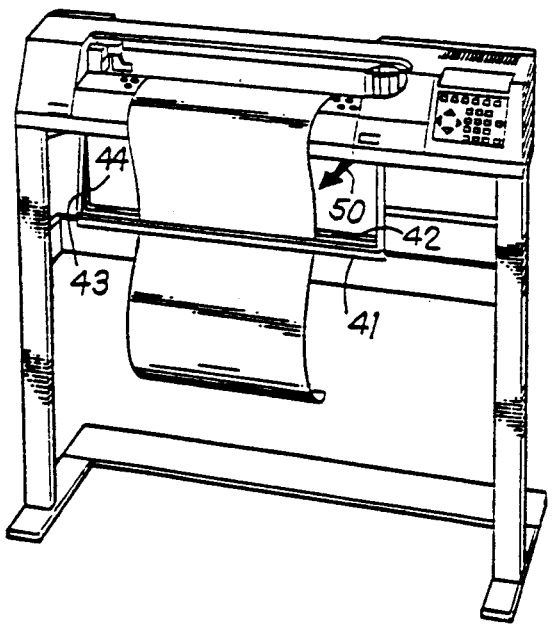

Reference will now be made to FIGS. 4A to 4E, which illustrate the successive stages of the execution and storage of a drawing utilizing a plotter of the type shown in FIG. 1. During execution of the drawing, the bars 41, 42 are in a rear position and the air flux 50 holds the hanging portion 20a of the print medium away from the storage bar 40, and towards the front of the machine (FIG. 4A). The air flux 50 also has the effect of making the portion 20a of the print medium less sensitive to ambient draughts (e.g. from open windows, air conditioning, etc.) which could force it against the printer. After execution of the drawing, the print medium is driven rearwards, the air flux 50 is stopped, and the bars 41, 42 are raised towards the front. The print medium is then placed in such a manner that its end 22 engages between bars 41, 42 and the storage bar 40, while at the same time secondary guiding is provided by means of the air flux 50 (FIG. 4B). When the middle of the drawing reaches the level of the bars 41, 42, the latter are brought to a rear position to press the print medium onto the top of the storage bar 40 substantially at the level of the center of the drawing (FIG. 4C). It should be noted that this pressure is provided by bar 41 which comes into abutment against the top of bar 40, whereas bar 42 can pass over bar 40, the arms 43 descending lower than arms 44.

Figure 4D:
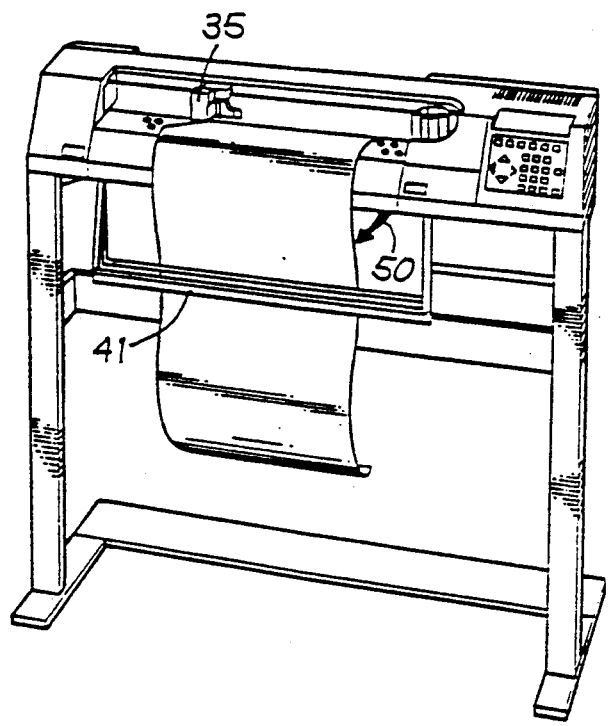
Figure 4E:
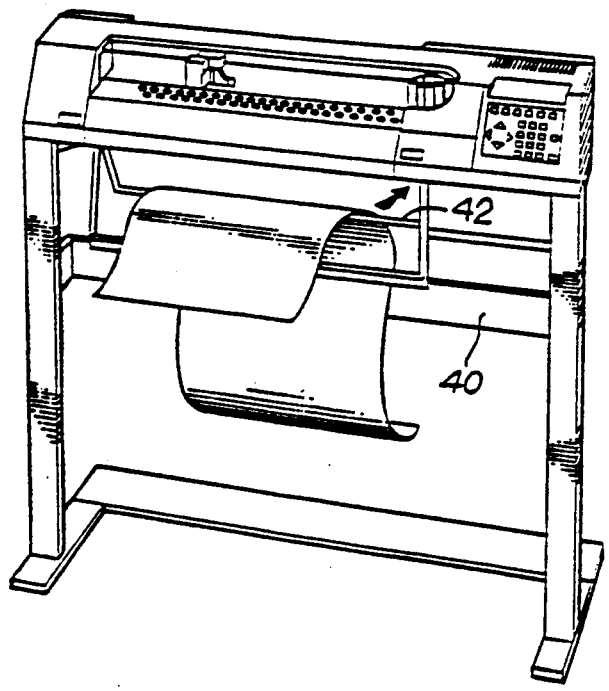

Next, the advance of the print medium is stopped when the rear edge of the drawing reaches the level of the cutting device 35. The cutting device 35 is then activated (FIG. 4D). Finally, the air flux 50 is stopped and bar 42 is displaced rearwardly to allow the second part of the cut drawing to pass behind the storage bar 40, in order to suspend the cut drawing over the storage bar 40 (FIG. 4E). Bar 42 is then brought to its initial position.

Figure 5:
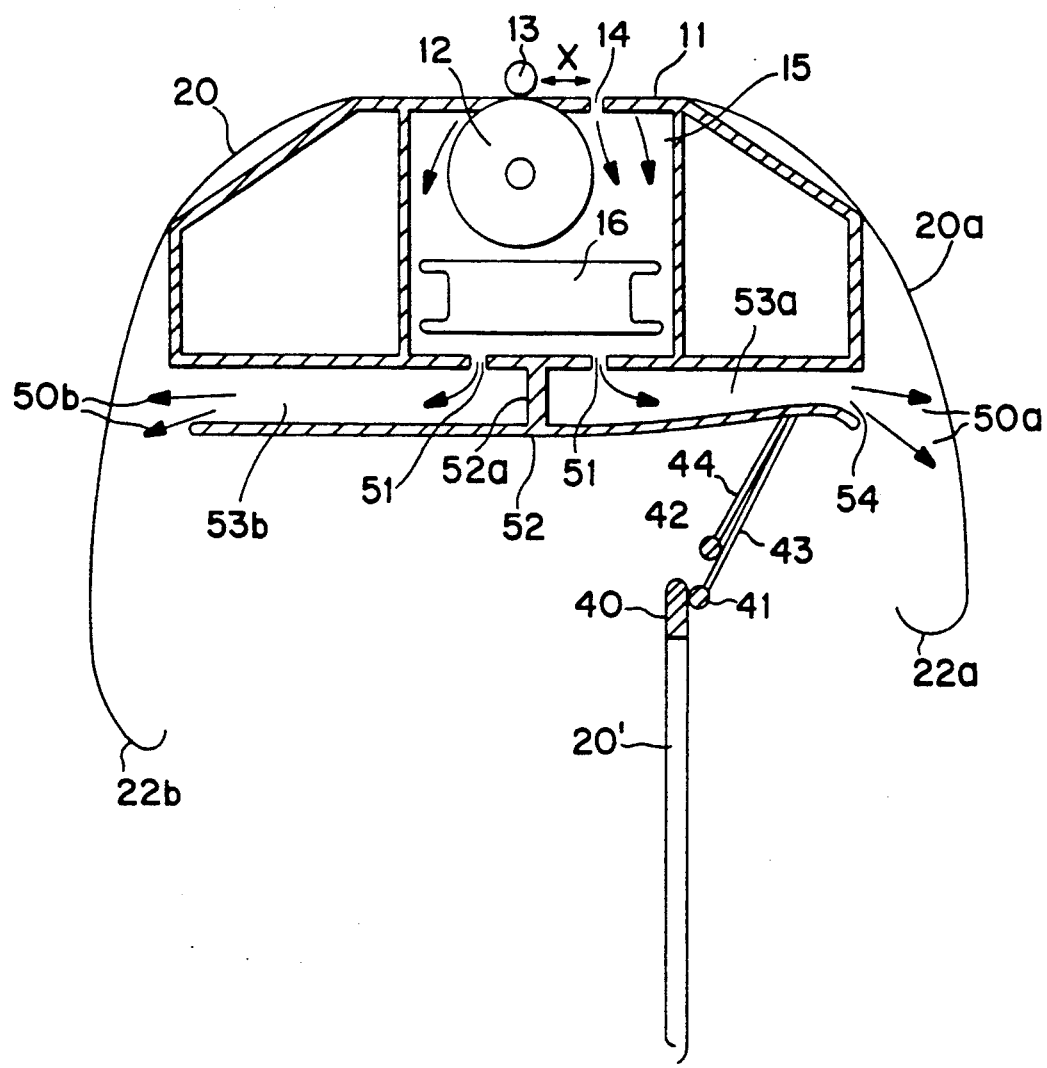
FIG. 5 is a schematic cross-sectional view of a pen plotter equipped with a secondary guidance system according to an alternate embodiment of the present invention.

Although the present examples concern a pen plotter working with a continuous print medium, it will be understood that the invention also applies to pen plotters working with cut sheets. In the latter case, as seen in FIG. 5, the secondary guiding of the print medium 20 will advantageously be carried out not only at the front, but also at the rear of the printer, by means of two separate air fluxes 50a and 50b directed in opposite directions towards the parts of the print medium 22a and 22b that hang freely from the front and rear of the printer, respectively. As seen in FIG. 5, the deflector 52 is partitioned into front and rear compartments 53a and 53b by divider 52a. Moreover, it will be understood that the present invention also applies to raster plotters in which the drawing is made from successive lines of dots.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A graphics printer comprising in combination:
   means for printing on a print medium;
   a platform structure over which said print medium is guided;
   means for advancing said print medium; and
   means for generating an air flux to be directed toward a freely hanging lead end of said print medium so as to prevent said freely hanging lead end of said print medium from physically contacting any part of said printer, said air flux generating means comprising a suction means provided within a housing defining a suction chamber for creating a partial vacuum beneath said print medium in an operating zone of said printing means, said air flux being at least partially produced by said suction means.

2. The graphics printer of claim 1, further including a deflector means for directing said air flux towards said freely hanging end of said print medium.

3. The graphics printer of claim 1, including a deflector means defining a duct of variable cross-section in combination with said housing of said vacuum chamber for directing said air flux towards said freely hanging end of said print medium.

4. The graphics printer of claim 1, wherein said platform structure is provided with apertures which cooperate with said suction means to produce a partial vacuum beneath said print medium and which contributes to the generation of said air flux.

5. The graphics printer of claim 4, further including at least one air inlet in said housing of said suction chamber positioned other than on said platform structure.

6. The graphics printer of claim 1, wherein said means for generating said air flux comprises at least one dedicated generator which at least partially produces said air flux.

7. The graphics printer of claim 1, further including at least one air flux generator dedicated entirely to contributing to the production of said air flux capable of cooperating with said suction means to produce an additive air flux effect.

8. The graphics printer of claim 7, wherein said at least one dedicated air flux generator is such that it is controllably activated as a function of air flow produced by said suction means.

9. The graphics printer of claim 7, wherein said at least one dedicated air flux generator is such that it is controllably activated as a function of properties and/or width of material constituting said print medium.

10. The graphics printer of claim 7, wherein said suction means and said at least one dedicated air flux generator are comprised of a plurality of fans.

11. The graphics printer of claim 7, further including an air deflector associated with said at least one dedicated air flux generator.

12. A secondary guidance system of a graphics printer which includes a printing means for printing on a print medium, said guidance system preventing a free end of said print medium from physically contacting any part of said graphics printer, comprising:
    means for generating an air flux within said graphics printer comprising a suction means provided within a housing defining a suction chamber for creating a partial vacuum beneath said print medium in an operating zone of said printing means, said air flux being at least partially produced by said suction means; and
    means for controlling a flow path of said air flux in a direction and to a location so as to prevent a freely hanging lead end of said print medium from contacting any part of said graphics printer during a printing operation.

13. The guidance system of claim 12, including a deflector means for directing said air flux towards said freely hanging end of said print medium.

14. The guidance system of claim 12, further including a deflector means defining a duct of variable cross-section in combination with said housing of said vacuum chamber for directing said air flux.

15. The guidance system of claim 12, wherein a print medium platform is provided with apertures which cooperate with said suction means to produce a partial vacuum beneath said print medium and which contributes to the generation of said air flux.

16. The guidance system of claim 15, further including at least one air inlet in said housing of said suction chamber positioned other than on said platform structure.

17. The guidance system of claim 12, wherein said means for generating said air flux comprises at least one dedicated generator which at least partially produces said air flux.

18. The guidance system of claim 12, further including at least one air flux generator dedicated entirely to contributing to the production of said air flux capable of cooperating with said suction means to produce an additive air flux effect.

19. The guidance system of claim 18, wherein said at least one dedicated air flux generator is such that it is controllably activated as a function of air flow produced by said suction means.

20. The guidance system of claim 18, wherein said at least one dedicated air flux generator is such that it is controllably activated as a function of properties and/or width of material constituting said print medium.

21. The guidance system of claim 18, wherein said suction means and said at least one dedicated air flux generator are composed of a plurality of fans.

22. The guidance system of claim 18, further including an air deflector associated with said at last one dedicated air flux generator.

23. A graphics printer comprising in combination:
    means for printing on a print medium;
    a platform structure over which said print medium is guided;
    means for advancing said print medium; and
    two distinct means for generating separate air fluxes directed in opposite directions towards freely hanging parts of a cut sheet print medium at a front and rear section of said printer so as to prevent said freely hanging parts of said print medium from physically contacting any part of said printer.

* * * * *